March 24, 1936.  E. H. PERKINS ET AL  2,035,401
TRANSPORTATION OF AUTOMOBILES
Filed Oct. 21, 1933  2 Sheets-Sheet 1

INVENTORS
Edward H. Perkins +
BY Hubert E. Mills.
Thomas Griswold Jr. + E. G. Burdick.
ATTORNEYS March 24, 1936.  E. H. PERKINS ET AL  2,035,401
TRANSPORTATION OF AUTOMOBILES
Filed Oct. 21, 1933   2 Sheets-Sheet 2

INVENTORS
Edward H. Perkins +
BY Hubert E. Mills.
Thomas Griswold Jr. + E.G. Burdick.
ATTORNEYS Patented Mar. 24, 1936

2,035,401

UNITED STATES PATENT OFFICE 2,035,401

TRANSPORTATION OF AUTOMOBILES

Edward H. Perkins and Hubert E. Mills, Midland, Mich., assignors to The Dow Chemical Company, Midland, Mich., a corporation of Michigan Application October 21, 1933, Serial No. 694,534

2 Claims. (Cl. 280—33.1)

The invention relates to methods of loading automobiles upon a semi-trailer adapted for their transport.

It is an object of the invention to provide a method of loading three automobiles for transportation in such manner that they can be carried in considerably less over-all space than is possible with heretofore known methods. The term "automobile" is herein used in its broad sense and includes passenger cars, trucks, chassis with cab, etc. By "higher portion" of an automobile is meant that portion which requires the greater clearance height, i. e. ordinarily the cab end of a truck, or the rear end of a passenger automobile.

To the accomplishment of the foregoing and related ends, the invention, then, consists of the method hereinafter fully described and particularly pointed out in the claims, the annexed drawings and the following description setting forth in detail certain methods of carrying out the invention.

In said annexed drawings:—

Figure 1:
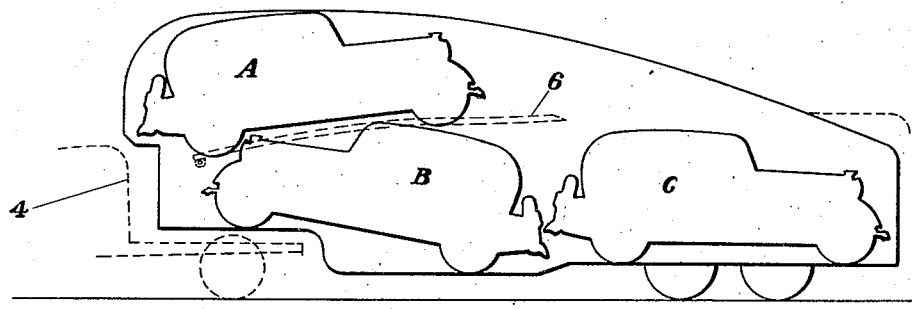
Figure 1 is a diagrammatic side sectional elevation constituting a loading diagram of our method for arranging three automobiles upon a semi-trailer.

Our method of arranging three automobiles for transportation on a semi-trailer comprises placing in an elevated position at the forward end of the semi-trailer an automobile with its lower portion toward the center of the semi-trailer and with the set of wheels at the end of the higher portion of the automobile depressed with respect to the set of wheels at the end of the lower portion of the automobile, then placing at the forward end of the semi-trailer substantially below said first automobile a second automobile with its higher portion toward the center of the semi-trailer and with the set of wheels at the end of its lower portion elevated with respect to the set of wheels at the end of its higher portion and with a part of its higher portion extending above the bottom level of the set of wheels at the end of the higher portion of the said first automobile, and then placing on the vehicle a third automobile with its higher portion endwardly adjacent the higher portion of the said second automobile.

Referring to the drawings:—

Figure 2:
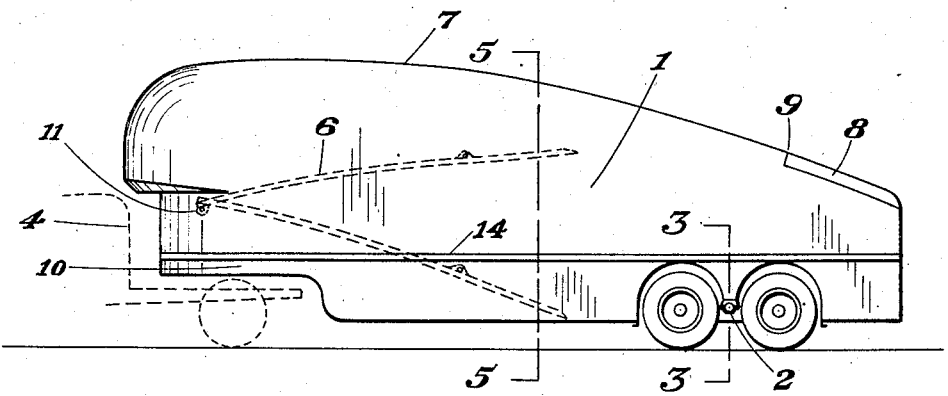
Figure 2 is a side elevation of one form of semi-trailer adapted to be loaded according to the method constituting the present invention.
Figure 4:
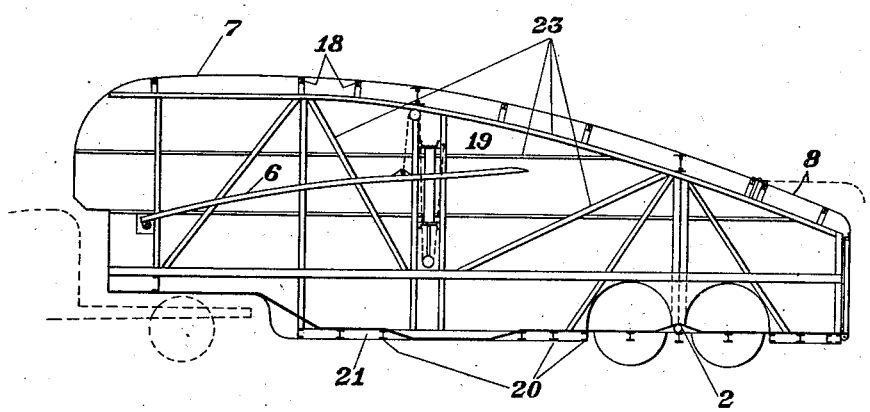
Figure 4 is a longitudinal sectional elevation of the semi-trailer shown in side elevation in Figure 2.
Figure 5:
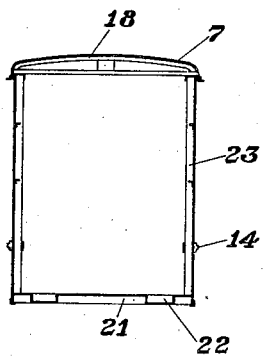
Figure 5 is a transverse section taken on the line 5—5 of Figure 2.

In Figure 2 is shown a completely enclosed semi-trailer having a body 1 comprising as shown in Figure 4, on each side of the body a truss 23 carried terminally upon the axle 2, a floor 21, and a roof 7. Figures 4 and 5 show the arrangement of the transverse cross-members 20 carried by the side trusses 23, which members in turn carry the floor 21. In Figure 5 there is shown particularly the relationship between the cross-members 18 supporting the roof 7 and the side truss 23. In Figure 5 the guide wells 22 in the floor 21 for the wheels of the automobiles to be carried are also shown. The truss 23 is cut away at its lower forward end to provide a raised portion 10 adapted to be supported upon a pulling vehicle 4. At the point 11 on the raised portion 10 of the side truss 23 there is pivoted, substantially endwardly, the ramp 6 which is adapted to movement so that its free end can rest upon the floor of the semi-trailer. Figure 4 shows attached to the side truss 23 the hoisting mechanism 19 for elevating the ramp 6. The roof 7 is provided at its rear end with a section 8 movable to permit access of automobiles to the interior of the semi-trailer. Preferably this movable section 8 is hinged at the point 9 and means (not shown) are provided to swing the section upwardly about its hinged end.

Figure 3:
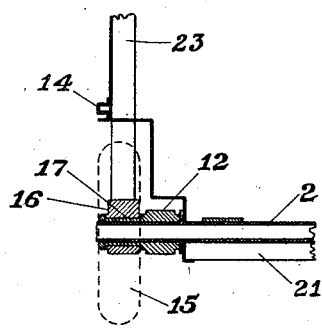
Figure 3 is an enlarged part section taken on the line 3—3 of Figure 2.

Figure 3 shows a transverse part section of the axle, walking beam, and side truss assembly. In Figure 3 the side truss 23 rests upon the bearing cap 16 containing the sleeve 17. This sleeve 17 is welded to the rocker beam 12, which beam is carried on the axle 2 laterally inside the bearing cap supporting the side truss 23. The floor 21 lies below the level of the axle 2. The tandem wheels 15 are substantially aligned transversely with the side truss 23. On the side truss 23 there is a rub-rail 14 to prevent damage to the paint on the sides of the trailer.

In Figure 1 is shown the arrangement of automobiles obtained by the carrying out of our hereinbefore described method of loading three automobiles upon the semi-trailer illustrated in above described figures. The automobile A is first run upon the swinging ramp 6 when the free end of the ramp is at rest upon the floor of the semi-trailer. After this automobile is in position upon the ramp, and has been suitably fastened, the ramp is swung upwardly to bring the automobile into the position shown in the diagram. The automobile B is then moved substantially under the automobile A, and the automobile C is placed upon the floor with its higher portion adjacent the automobile B.

It is apparent from the foregoing description that our invention provides a method of loading three automobiles upon a semi-trailer, particularly a completely enclosed semi-trailer, which makes possible the carrying of the same in a minimum of length and height.

This application is a continuation-in-part of our prior filed application Serial No. 678,340.

Other modes of applying the principle of our invention may be employed instead of those explained, change being made as regards the means herein disclosed, provided the method stated by the following claims or the equivalent of such stated method be employed.

We therefore particularly point out and distinctly claim as our invention:—

1. In a method of loading three automobiles on a semi-trailer adapted to be supported at its forward end upon a pulling vehicle, the steps which consist in; first, moving over the floor of the semi-trailer to the forward end thereof an automobile with its higher portion toward the forward end of said semi-trailer to a position so that the set of wheels at the end of its higher portion is elevated with respect to the set of wheels at the end of its lower portion; second, elevating said automobile to a position sufficiently above the floor of said semi-trailer to permit access of an automobile substantially therebelow; third, placing substantially below said first automobile a second automobile with its lower portion toward the forward end of the semi-trailer and with the set of wheels at the end of its lower portion elevated with respect to the set of wheels at the end of its higher portion; and, fourth, placing a third automobile endwardly adjacent said second automobile.

2. In a method of loading three automobiles on a semi-trailer adapted to be supported at its forward end upon a pulling vehicle, the steps which consist in; first, moving an automobile upon said semi-trailer to a position such that its higher portion is sufficiently elevated above the part of the floor of the semi-trailer supported upon the pulling vehicle to permit access of the lower portion of an automobile therebelow; second, elevating the lower portion of the said automobile to a sufficient height to permit access of the higher portion of an automobile therebelow; third, placing suostantially below said first automobile a second automobile with its lower portion substantially below the higher portion of the first automobile and with the set of wheels at the end of its lower portion elevated with respect to the set of wheels at the end of its higher portion; and fourth, placing a third automobile with its higher portion endwardly adjacent said second automobile.

EDWARD H. PERKINS.
HUBERT E. MILLS.